(12) United States Patent
Ahrens et al.

(10) Patent No.: US 6,830,079 B1
(45) Date of Patent: Dec. 14, 2004

(54) INTEGRATED APPARATUS AND METHOD FOR FILLING POROUS COMPOSITE PREFORMS

(75) Inventors: James M. Ahrens, Hockessin, DE (US); Daniel Domanski, Kennett Square, PA (US); John A. Hornor, Newark, DE (US); Ruth Hughes, Newark, DE (US); Dennis James Landini, Newark, DE (US); Roger Lee Ken Matsumoto, Newark, DE (US); Hongyu Wang, Hockessin, DE (US); Troy Frederick Brenner, Townsend, DE (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/648,355

(22) Filed: Aug. 27, 2003

(51) Int. Cl.[7] ................................. B65B 1/04
(52) U.S. Cl. ............... 141/51; 141/8; 141/65; 164/61; 164/65; 264/101; 264/102
(58) Field of Search ............... 141/8, 65, 51; 164/65, 61, 97, 98, 120, 126; 264/101, 102

(56) References Cited

U.S. PATENT DOCUMENTS

| | | | | |
|---|---|---|---|---|
| 5,111,871 A | * | 5/1992 | Cook | 164/63 |
| 5,299,619 A | * | 4/1994 | Chandley et al. | 164/53 |
| 5,551,979 A | * | 9/1996 | Shealey | 118/70 |
| 6,099,906 A | * | 8/2000 | Palmer et al. | 427/296 |
| 6,360,809 B1 | * | 3/2002 | Cornie et al. | 164/65 |

\* cited by examiner

*Primary Examiner*—Steven O. Douglas
(74) *Attorney, Agent, or Firm*—Nixon & Vanderhye PC

(57) ABSTRACT

A method and apparatus for filling preforms with resin or slurry includes a tank for holding the slurry and an autoclave for holding the preforms. The tank and autoclave have a common vacuum system connected thereto, and the tank is disposed above the autoclave. This arrangement provides a compact casting system which utilizes a vacuum and gravity to transfer slurry from the tank to the preforms within the autoclave.

16 Claims, 6 Drawing Sheets

INTEGRATED APPARATUS AND METHOD FOR FILLING POROUS COMPOSITE PREFORMS

BACKGROUND

The present invention is directed to an integrated apparatus and method for filling a porous composite preform with a slurry or resin.

The filling of a porous composite preform with particulate slurries or resins has until now been done in separate steps with separated pieces of equipment. As a result, such conventional systems and methodologies have been time consuming and expensive both to operate and construct.

SUMMARY OF THE INVENTION

The present invention involves the provision of and use of three separate chambers interconnected by one common vacuum system. A tank holding slurry is preferably disposed above an autoclave with the tank and autoclave being connected to the common vacuum system. With this arrangement, slurry can be easily and efficiently transferred between the tank and autoclave by the use of the vacuum and gravity.

In addition, since the uninfiltrated slurry/resin remains viable, it can be drained, again by the vacuum and gravity into a holding tank. The slurry/resin in the holding tank can then be pumped up to the feed tank, but since the vacuum level of all tanks are the same, the slurry/resin has not degraded due to atmospheric effects, nor has it gained entrapped air.

A similar process is used in the polymer composites industry, whereby polymers are infiltrated into organic fiber or glass fiber preforms. However, a differential vacuum is used to transport polymer from one tank to the other.

This invention integrates the operations of 1) slurry/resin preparation, 2) preform preparation, 3) slurry/resin transfer to preform, 4) slurry/resin removal from preform, 5) recycling of slurry/resin, 6) initial drying of slurry/resin. It also allows pressure application during preform filling if required.

Aside from the conventional ball mill that will be used to batch the slurry/resin, all operations are performed in different chambers or containers that are connected to the same vacuum system. This allows the transfer of slurry/resin between containers to be done with the use of the vacuum and gravity. When pressure is needed in the filling step, the main chamber will be isolated from the vacuum system and then pressurized.

The inventive apparatus and method are especially suited for filling turbine shrouds, turbine engine liners, and for other SiC products.

DETAILED DESCRIPTION OF THE INVENTION

Figure 1:
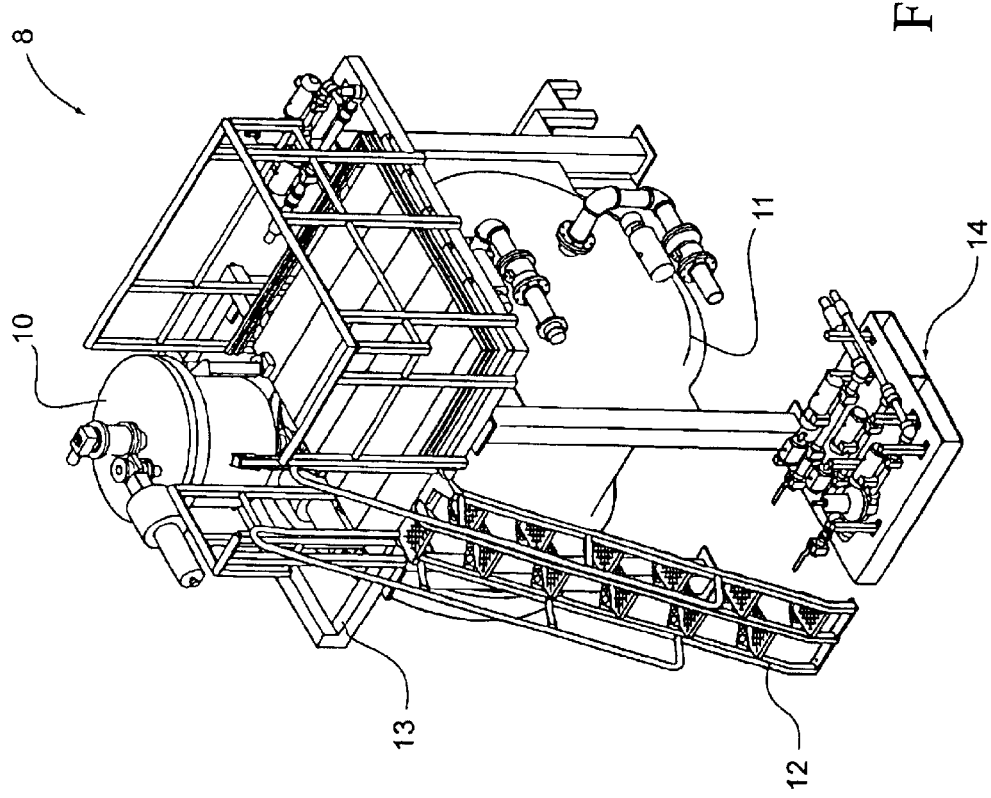
FIG. 1 shows a slurry/resin casting system in accordance with the preferred embodiment of the present invention.

FIG. 1 shows slurry/resin casting system 8 to include autoclave 11, and tank 10, surrounded by platform 13 and access ladder 12. Also shown in FIG. 1 is valve palate 14 which provides a centralized location for the valve connections between tank 10, autoclave 11 and other equipment discussed below. As shown in FIG. 1, tank 10 and autoclave 11 are integrated into a relatively compact and accessible arrangement.

The work platform 13 and ladder 12 provide access to tank 10. The structure should conform to all applicable OSHA and local building code specifications.

Figure 2:
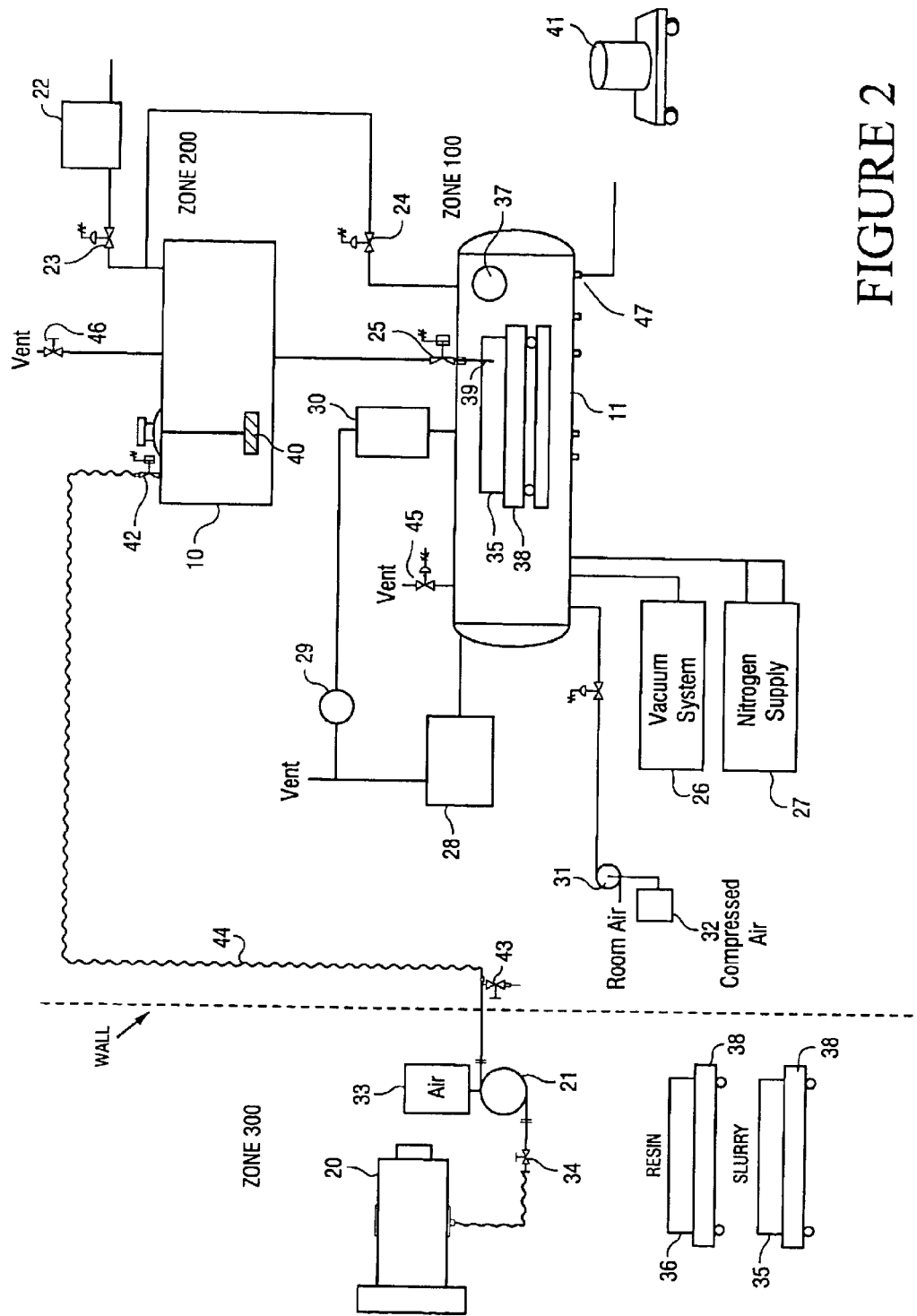
FIG. 2 shows in block schematic form the main components of the slurry/resin casting system.

The slurry/resin casting system 8 is shown in greater detail in FIG. 2. In FIG. 2, tank 10 is shown to be interconnected to autoclave 11 and through diaphragm transfer pump 21 to ball mill 20. Ball mill 20 is shown to be remotely located, on the other side of a wall, from tank 10 and autoclave 11.

A vacuum system (not shown) is connected through valves 22 and 23 to tank 10 and through additional valve 24 to autoclave 11. The connection between tank 10 and autoclave 11 is made through pinch valve 25. Autoclave 11 is also connected to the vacuum system through a set of valves 26 and to a nitrogen source (not shown) through a set of valves 27. Autoclave 11 is vented through a set of valves 28 which are in parallel to oxygen sensor 29 connected in series to a set of valves 30. Finally, room air and compressed air are supplied to autoclave 11 through a pump 31 with the compressed air also being supplied through a set of valves 32.

Interlocks are provided to prevent the improper opening of process valves when the autoclave vessel pressure is above ambient pressure. For example, an over pressure condition within autoclave 11 will cause a system fault and close the nitrogen supply lines.

The presence of oxygen within the autoclave 11 above a programmed threshold limit will cause a system fault and prevent the delivery of power to the platen heating elements. Oxygen sensor 29 has a range from 0 to 25%, and preferably the sensor should tolerate oxygen excursions above 25% without sensor damage.

An over temperature condition with respect to the heated platen will cause a system fault and result in power removal from the platen heating elements.

An interlock in the autoclave door opening mechanism prevents human incursion into the autoclave interior until the interior pressure is within a small tolerance band about ambient pressure and the oxygen content within the autoclave has been restored to levels exceeding 19.5% (normal is 20.9%). Autoclave 11 can be vented to the atmosphere through valve 45 and tank 10 can be vented to the atmosphere through valve 46.

All of the above-described interlocks are hard wired and do not employ a software controlled system to enforce the interlock.

The ball mill 20 is provided for mixing the SiC slurry. No particle size reduction is required in this process.

A Naigene® part container 35, 36 is placed, on a rolling cart 38. Cart 38 is moved using a hand truck (not shown). Preforms will be placed in part container 35, 36 and the entire package rolled off the hand truck into autoclave 11.

Transfer pipe 39 connects the slurry supply, for example, to part container 35.

A stainless steel diaphragm pump 21, with a neoprene diaphragm, provides the pressure to pump the slurry from ball mill 20 to tank 10. Ball mill 20 is connected to pump 21 through valve 34, and a set of valves 33 supplies atmospheric air to pump 21. Flexible piping 44 connects discharge valve 43 at one end and pinch valve 42 at the tank end.

Two degassing methods are possible. First, tank 10 can be evacuated before transfer of the slurry from the ball mill 20. As the slurry enters tank 10, it will be directed to the wall of the tank to promote degassing. Alternatively, the entire charge of slurry (approximately 20 gallons) can be transferred under normal conditions and degassed in bulk.

A four blade paddle wheel mixer 40 along with four internal tank baffles (not shown) provide for the stirring of the slurry in tank 10.

Under vacuum conditions (28" Hg), slurry will be metered into autoclave 11 through automated pinch valve 25. An operator can judge the slurry level in autoclave 11 through sight glass 37 and manually close pinch valve 25 when sufficient slurry has been transferred.

A nitrogen source (not shown) is used to apply pressure to autoclave 11. The pressure level is programmed and controlled through a system programmable logic controller (PLC) 50, shown in FIG. 3. In the exemplary embodiment the maximum pressure is 125 psi.

The pressure is ramped to ambient. A blower (not shown) provides adequate flow through the autoclave to ensure safe oxygen levels before allowing the door (not shown) to open. A whistle valve with interlock is provided, as noted previously, to prevent premature opening of the door when autoclave 11 is still under pressure.

A drain port 47 allows removal of excess slurry from the part container 35 after autoclave 11 is opened. The excess slurry can be, for example, drained into portable recycle tank 41.

Figure 6:
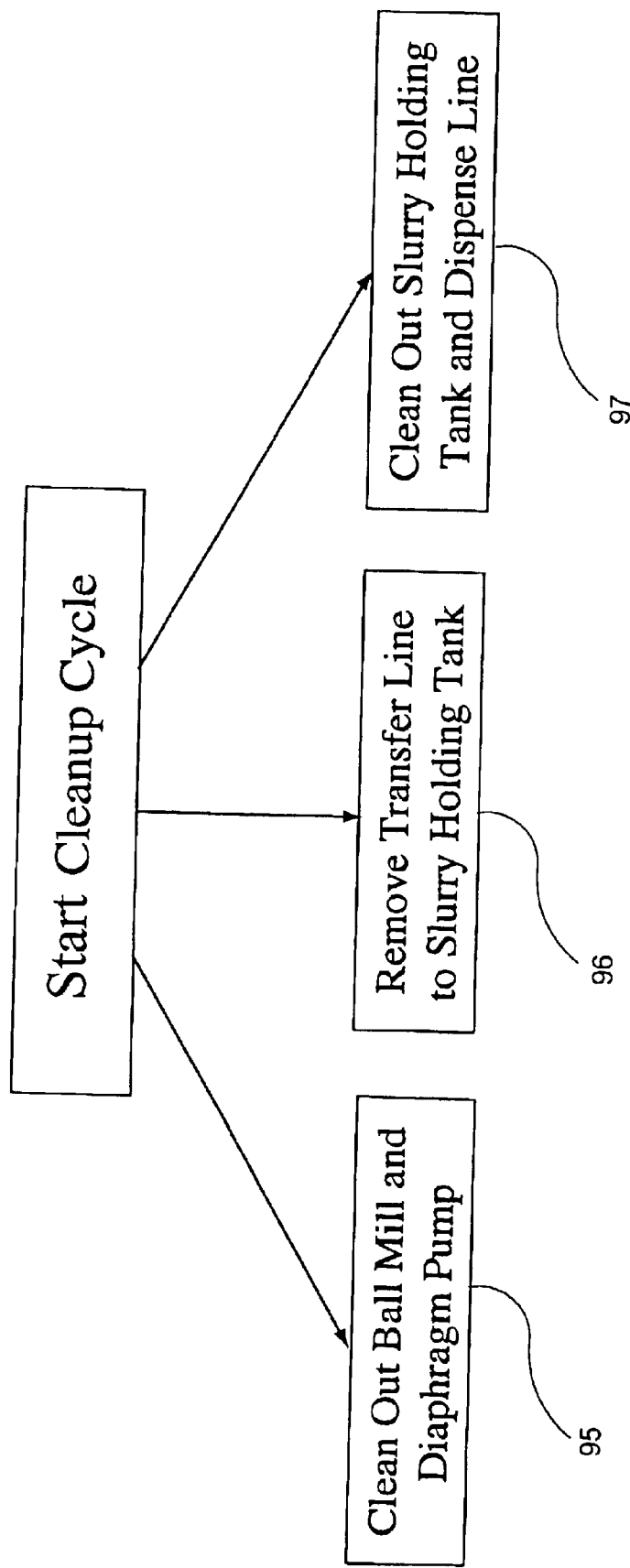
FIG. 6 shows clean-up cycles for the slurry/resin casting system.

As shown in FIG. 6, clean up of the system can be easily accomplished in three independent processes 96, 97 and 98. The ball mill 20 and diaphragm pump 21 are cleaned in process 95 by using flush water disposed through a drain valve into a container. All other hose and transfer lines are quick disconnect for remote clean-up as shown by processes 96 and 97.

Ball mill 20 has a total mill capacity of 90 gallons, and a slurry capacity of 60 gallons. Tank 10 is preferably made of stainless steel and has a capacity of 75 gallons. Autoclave 11 is preferably made of carbon steel and has a capacity of 48"×48"×30". Recycle tank 41 preferably has a 25 gallon capacity and is made of stainless steel.

Cam and groove fittings with replaceable flex hose are used for slurry transfer from the diaphragm pump 21 to slurry tank 10. All valves in contact with slurry are pinch valves to reduce the possibility of clogging or jamming. All other valves for services are ball, globe, diaphragm, or solenoid valves.

Resin mixing is done in a remote resin handling laboratory. Resin is dispensed from a portable tank (not shown) into the part container 36. Autoclave 11 processing preferably involves the following settings or parameters: Vacuum—28" Hg vacuum capability; Pressure—125 psi $N_2$ pressure capability; Heat—2 hours to 150C, 30 minutes hold at 150C, turn off and cool under pressure; and Removal—by venting to atmosphere, and opening autoclave 11 and removing part container 36.

Slurry transfer from ball mill 20 to tank 10 involves the following: slurry raw materials are manually weighed on a scale; weighed raw materials are transferred to ball mill 20; slurry mixture is agitated in ball mill 20; and the material is transferred from ball mill 20 to tank 10 via air-powered diaphragm transfer pump 21.

Controls to start and stop pump 21 are accessible at a control station (not shown) near pump 21 and at a control station (not shown) at tank 10.

Tank 10 employs an interlock to prevent overfilling and is vented through valve 46. The system has the ability to vacuum degas during the transfer operation and subsequent to the transfer operation. Slurry holding tank mixer 39 may be started and stopped independent of the state of the transfer operation or the degas cycle.

Figure 4:
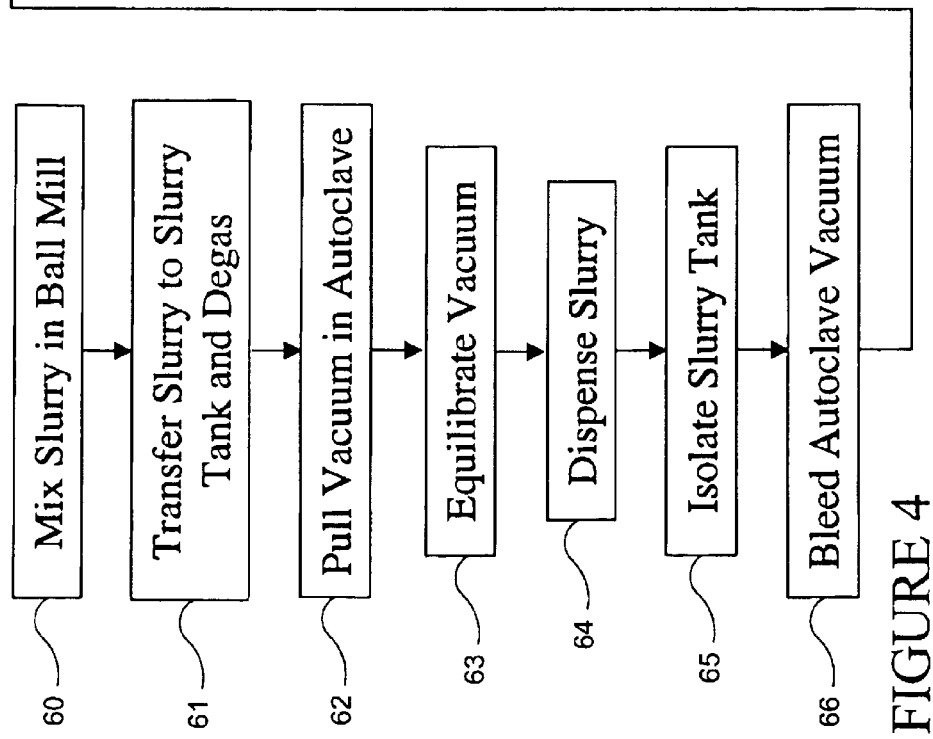
FIG. 4 is a flow chart describing the slurry processing cycle.

The Slurry Processing Cycle, as shown in FIG. 4, includes steps 60–73. Step 60 involves mixing the slurry in ball mill 20. Step 61 involves transferring the slurry to holding tank 10 and degassing the slurry. Step 62 involves bringing autoclave 11 pressure from ambient conditions to the programmed vacuum level. Step 63 involves equilibrating the vacuum in autoclave 11 and slurry holding tank 10. Step 64 involves, under operator command, opening valve 25 between slurry holding tank and autoclave 11. Step 65 involves isolating slurry holding tank 10 from autoclave 11. Step 66 involves releasing the autoclave vacuum (bleed to atmospheric pressure). Step 67 involves applying blanketing nitrogen pressure. Step 68 involves the initial bleeding of the autoclave. Step 69 involves final depressurization of autoclave 11. Step 70 involves purging the nitrogen atmosphere and confirming restoration of normal oxygen levels. Step 71 involves opening the autoclave door and removing parts from the autoclave. Step 72 involves, external to the autoclave, draining excess slurry into portable recycle tank 41, Finally, step 73 involves, external to the autoclave, allowing the preform to air dry.

Figure 5:
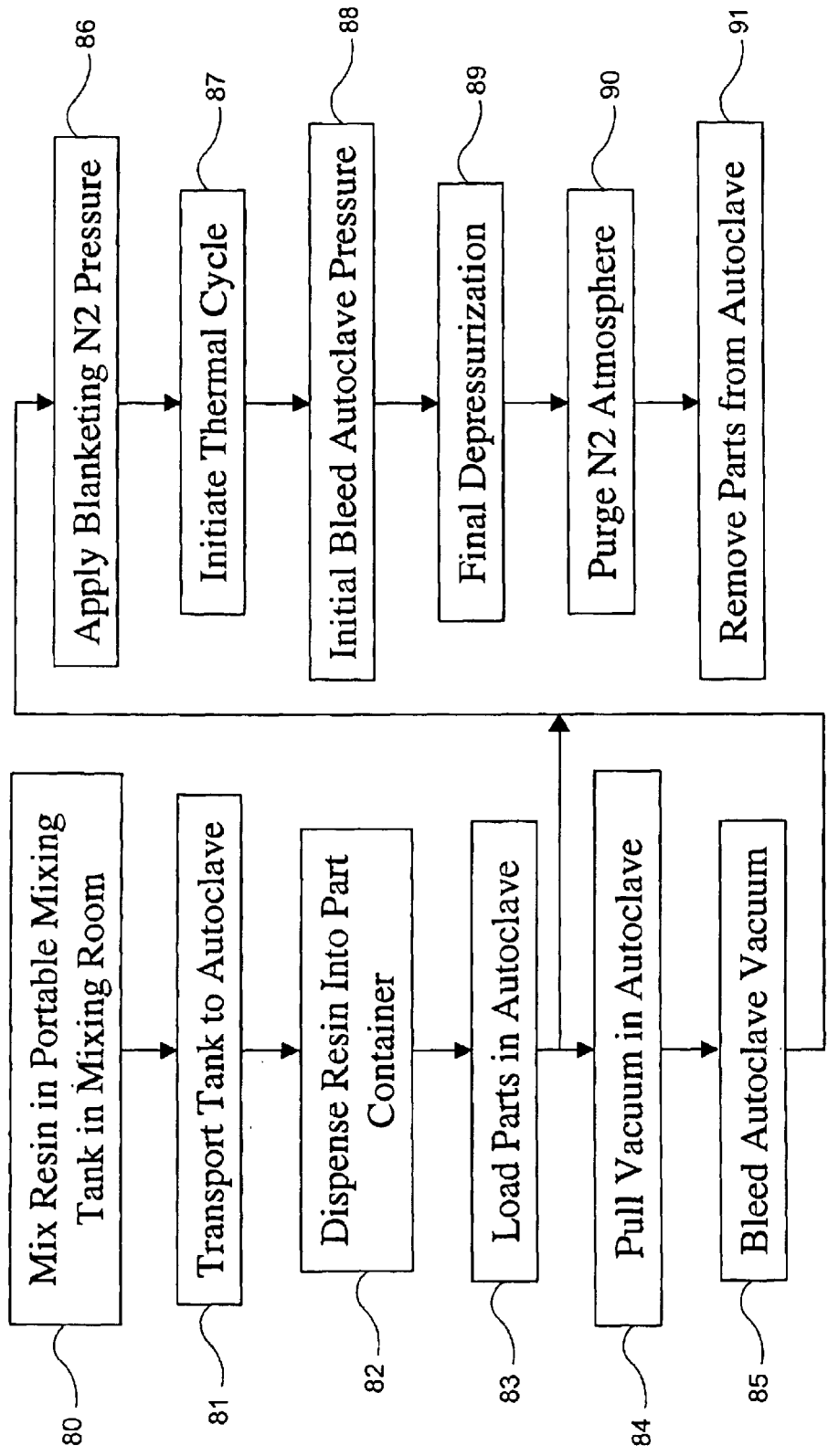
FIG. 5 is a flow chart showing the resin processing cycle.

The Resin Processing Cycle, as shown in FIG. 5, includes steps 80–91. Step 80 involves preparing resin in a mixing room, and transferring the resin to one or more mixing tanks. Step 81 involves transporting the tank to autoclave 11. Step 82 involves, external to the autoclave, pressurizing the mixing tank to transfer the resin from the tank to part container 36. Step 83 involves opening the autoclave door, rolling the resin filled part container 36 into the autoclave, and closing the autoclave door. Step 84 involves, if a vacuum cycle is desired, applying a vacuum to the autoclave and running the programmed vacuum cycle (ramp to vacuum and dwell). If a vacuum is not desired, the process skips to step 86. Step 85 involves releasing the autoclave vacuum (bleed to atmospheric pressure). Step 86 involves applying blanketing nitrogen pressure. In step 87, if the autoclave oxygen content is below the combustion threshold the programmable temperature cycle is initiated. Step 88 involves applying the pressure cycle per programming within the pressure controller, and performing the initial bleed of the autoclave pressure. Step 89 involves performing final depressurization to near atmospheric pressure. Step 90 involves removing the electrical power from the heating elements, purging nitrogen atmosphere, and confirming restoration of normal oxygen levels. Finally, step 91 involves opening autoclave 11 door and removing parts from autoclave 11.

Figure 3:
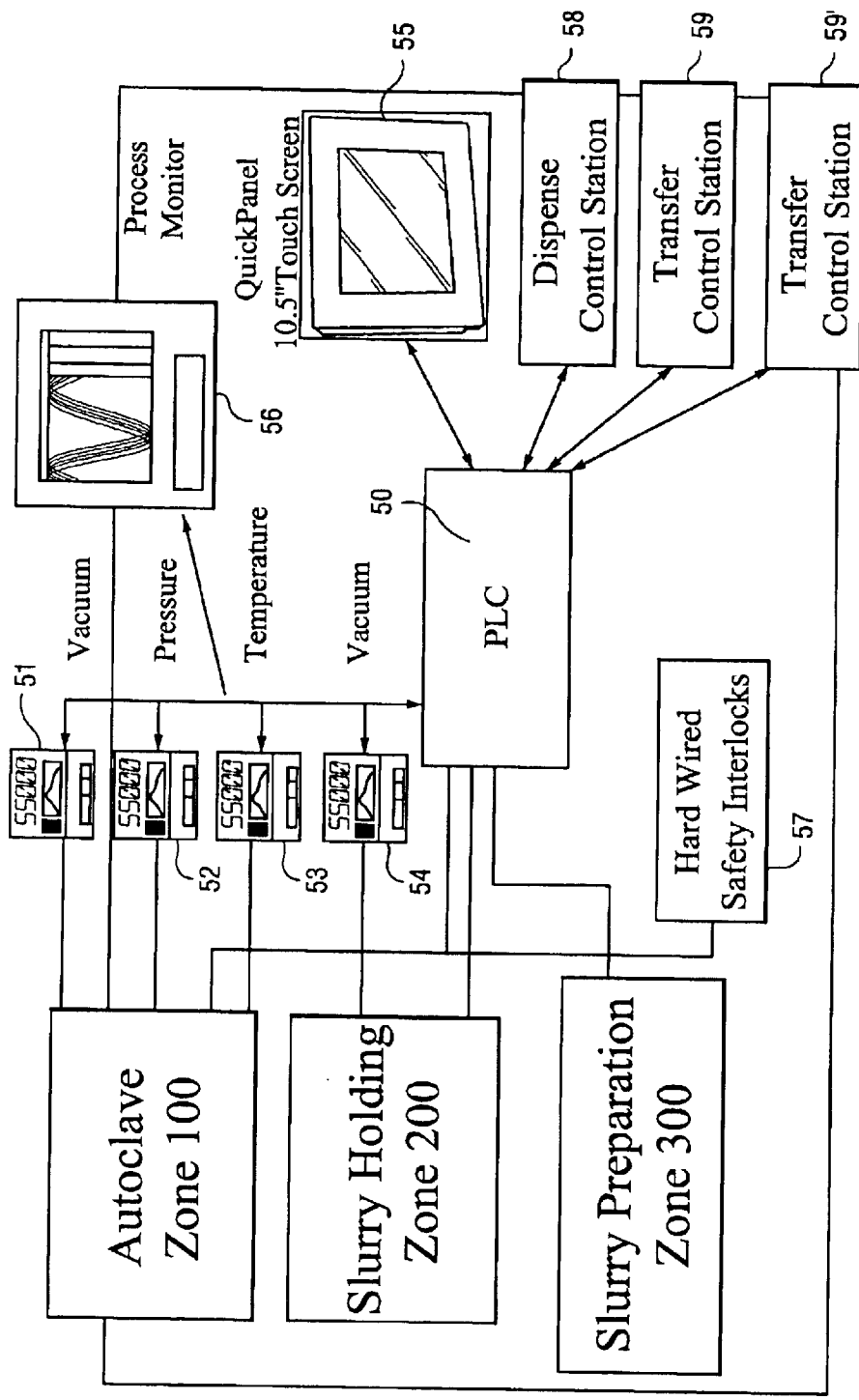
FIG. 3 is a block diagram of the control architecture for the slurry/resin casting system.

The control system, shown in FIG. 3, comprises three control zones: autoclave zone 100, slurry holding zone 200, and slurry preparation zone 300. PLC 50 is used to manage the interlocks within and between the control zones, execute the sequential processing steps, monitor the status of hard-wired safety interlocks, enable manual control of system elements, and collect process data. Preferably, the system uses a GE 30/90 PLC to execute the above-described functions.

The system employs a graphical operator interface terminal (OIT) 55 to control and view the status of control elements and the setpoint and process variable for control loops within each process zone. OIT 55 is used to initiate and interrupt process operations for all three process zones. In particular, OIT 55 is used to initiate the vacuum pressure cycle for the slurry holding zone and the vacuum, pressure, and heating cycles in the autoclave zone. OIT 55 provides a graphical display of all hard-wired safety interlocks to examine the sensor(s) state associated with each interlock.

OIT 55 also provides alarm information for error controls or out of control process loops. Individual, single loop process controllers 51, 52, 53, 54 are used to regulate process conditions between and in the autoclave and slurry holding zones.

A video graphical recorder 56 is provided to record the actual process variables during the process cycle. The video graphical recorder 56 is provided with an Ethernet interface and PCMCIA memory card to facilitate transfer of process data from the recorder to a PC (not shown) or corporate network (not shown) for archiving or further analysis. Setpoint parameters for process conditions will be entered via OIT 55, transmitted to PLC 50, and relayed to individual process controllers 51–54.

A communications interface is provided between PLC 50 and individual process controllers 51–54 capable of supporting transmission of process cycle parameters to process controllers 51–54 and process status and error conditions from process controllers 51–54 to PLC 50. The communications interface between PLC 50 and process controllers 51–54 is preferably Modbus.

The Autoclave Zone 100 incorporates software programmed interlocks to manage the process transition between vacuum, positive pressure, heating, venting, and restoration of an OSHA safe oxygen level. The Autoclave Zone 100 also incorporates hard-wired safety interlocks to mitigate the impact of the following fault conditions: over pressure; application of electrical heating in the presence of an oxygen level capable of supporting combustion; over temperature condition for heated autoclave platen; attempt to open door in presence of autoclave pressure that is not near zero gauge pressure; attempt, to open autoclave door in the absence of a safe oxygen level (>19.5% $O_2$); attempt to open valves between the slurry holding tank and the autoclave when the autoclave pressure is greater than atmospheric pressure; and attempt to open autoclave's high volume vent and blower valves when autoclave pressure is greater than atmospheric pressure.

The autoclave 11 incorporates disperse control station 58, which is accessible by the operator when viewing autoclave 11 through sight glass 37. The operator has the ability from the control station to turn the autoclave illumination on/off, to equilibrate the vacuum pressure in autoclave 11 and slurry holding tank 10, confirm that both zones are at equal pressure, and control the release of slurry into autoclave 11 at high and low rates. The control station will provide a fault lamp to prompt the operator if a system fault condition exists. The autoclave zone further includes process controllers to regulate the ramp rate and dwell time for the vacuum cycle, pressure cycle, and heating cycle.

The process cycle includes a software programmed interlock to prevent the restoration of normally oxygenated atmosphere until autoclave 11 is below a target temperature. This interlock helps prevent a potential combustion hazard due to the simultaneous presence of combustible fuel (uncatalyzed resin), oxygen, and ignition source (high temperature) being simultaneously present. The autoclave 11 incorporates automated control valves to control the flow into and out of the autoclave. These materials include slurry under vacuum, vacuum balance between autoclave and slurry holding tank, pressurization via nitrogen, vacuum, venting under various pressure condition, and normal atmosphere interchange.

Control valves are provided so that the rate of change vacuum and the vacuum pressure can be digitally controlled via a process controller. Likewise, control valves and devices are provided so that the rate of change of pressure and the pressure can be digitally controlled via a process controller. Separate process controllers control vacuum and pressure.

The system includes the ability to perform ramp and dwell cycles in the vacuum regime and pressurization cycles in the positive gauge pressure regime. Pressure switches are used to detect the transitions between the vacuum, ambient pressure, and above ambient pressure regimes for purposes of process sequencing and enforcement of safety interlocks.

The autoclave supports up to four Type-K thermocouple temperature sensors. Three temperature sensors are dedicated for use in regulating the part process temperature. Two sensors are used in a cascade control scheme that measures both the tooling surface temperature and the temperature of the component. Another temperature: sensor is used for an independent over temperature interlock. The remaining temperature sensor is available for general process monitoring.

Pressure within the autoclave is monitored with a compound range pressure transducer capable of sensing from −14.7 psig to 150 psig. The pressure transducer supplies a BRAIN-enhanced, 4–20 mA signal. The pressure transducer incorporates a local pressure display. The autoclave pressure is visible via OIT 55.

Oxygen sensor and associated alarm outputs are used to display the current oxygen content within the autoclave and oxygen status if the autoclave atmosphere is safe for human exposure or insufficient for combustion. The heating controls are sized sufficiently large to support a maximum heater wattage of 16 kW.

The Slurry Holding Zone 200 incorporates a process controller to determine the vacuum ramp rate and regulation at vacuum pressure. No specific interlocks based on the slurry holding tank are provided to prevent or limit the transfer of slurry from the slurry preparation area to the slurry holding tank if the tank pressure is less than or equal to atmospheric pressure. A hard-wired interlock is provided to prevent the valve between the slurry holding tank and the slurry preparation area from opening if the slurry holding tank pressure is greater than atmospheric pressure.

The slurry holding tank is outfitted with four limit switches to detect the fill level within the tank. These switches are the basis for a low—low, low, high and high-high level alarms. The normal maximum fill level is the high alarm. Status of the level switches is displayed on OIT 55.

The slurry mixer 40 is activated from OIT 55. The mixer 40 is outfitted with a sensor to confirm that the, mixer shaft is turning. The mixer is driven by a 3-phase AC induction motor with gearbox.

Pressure within tank 10 is monitored with a compound range pressure transducer capable of sensing −14.7 psig to 150 psig. The pressure transducer supplies a BRAIN-enhanced, 4–20 mA signal. The pressure transducer incorporates a local pressure display. The slurry holding tank pressure is visible via OIT 55.

Slurry Preparation Zone 300 incorporates transfer control station 59 to facilitate the transfer of resin from ball mill 20 to tank 10. The operator station incorporates a light indicating "Ready to Transfer." This light implies that tank 10 is not full, that a slurry dispense is not in process (balance valve closed and slurry pinch valve closed), and that tank 10 is not at a pressure above ambient. Pushbuttons start and stop the transfer process.

The pumping rate is controlled via the supplied air pressure. A manual regulator is provided to change this air pressure. A "transferring" light Vindicates that air is being supplied to diaphragm transfer pump 21 and slurry tank pinch valve 42 is open. A solenoid valve 33 is used to start and stop air flow to diaphragm pump 21. A pressure switch confirms operation of solenoid valve 33.

When the level in slurry holding tank 10 reaches the high or high-high limits, pump 21 is automatically stopped. Failure of the actuators in the slurry process results in a "Transfer Fault." An indicator lamp is provided at the slurry preparation control station. The OIT 55 displays information for all the feedback devices.

An identical transfer control station 59' is provided at tank 10 to start/stop transfer when the operator is near quick disconnect valve 43 for flex hose 44 connecting the slurry preparation area to tank 10.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vacuum enabled casting system for filling preforms comprising:
   a tank for holding a material for filling the preforms;
   an autoclave for containing the preforms that are to be filled with the material held in said tank; and
   a common vacuum system interconnected to said tank and said autoclave for causing the material held in said tank to flow to said autoclave through piping interconnecting said tank and said autoclave to fill the preforms contained therein.

2. The casting system as claimed in claim 1, wherein said tank is disposed above said autoclave.

3. The casting system as claimed in claim 1, further comprising a ball mill for preparing the material held in said tank, said ball mill and said tank being interconnected through second piping and a pump, said pump; being utilized to transfer the material through the second piping to said tank.

4. The casting system as claimed in claim 1, further comprising a pinch valve disposed within the piping interconnecting said tank and said autoclave for controlling the flow of the material from said tank to said autoclave.

5. The casting system as claimed in claim 2, further comprising a pinch valve disposed within the piping interconnecting said tank and said autoclave for controlling the flow of the material from said tank to said autoclave.

6. The casting system as claimed in claim 3, further comprising a pinch valve disposed within the piping interconnecting said tank and said autoclave for controlling the flow of the material from said tank to said autoclave.

7. The casting system as claimed in claim 1, wherein the material is resin.

8. The casting system as claimed in claim 2, wherein the material is resin.

9. The casting system as claimed in claim 4, wherein the material is resin.

10. The casting system as claimed in claim 1, wherein the material is slurry.

11. The casting system as claimed in claim 2 wherein the material is slurry.

12. The casting system as claimed in claim 3, wherein the material is slurry.

13. The casting system as claimed in claim 4 wherein the material is slurry.

14. The casting system as claimed in claim 1, further comprising a programmable control system for controlling and monitoring the flow of material between said tank and said autoclave.

15. The casting system as claimed in claim 1, wherein said programmable control system includes a plurality of remotely located control stations for facilitating remote operator control of said casting system.

16. A method for filling preforms with casting material involves locating a tank above an autoclave connecting the tank and the autoclave to a common vacuum system and utilizing a combination of vacuum and gravity to cause the casting material to flow from the tank to fill preforms disposed in the autoclave.

\* \* \* \* \*